(12) United States Patent
Li (10) Patent No.: US 10,868,416 B2
(45) Date of Patent: Dec. 15, 2020

(54) PROTECTION CIRCUIT INVOLVING POSITIVE TEMPERATURE COEFFICIENT DEVICE

(71) Applicant: SIERRA WIRELESS, INC., Richmond (CA)

(72) Inventor: Raymond Li, Richmond (CA)

(73) Assignee: Sierra Wireless, Inc., Richmond (CA)

( * ) Notice: Subject to any disclaimer, the term of this patent is extended or adjusted under 35 U.S.C. 154(b) by 404 days.

(21) Appl. No.: 15/910,087

(22) Filed: Mar. 2, 2018

(65) Prior Publication Data

US 2019/0273373 A1 Sep. 5, 2019

(51) Int. Cl.
| | |
|---|---|
| H02H 3/10 | (2006.01) |
| H02H 3/06 | (2006.01) |
| H01C 7/02 | (2006.01) |
| H02H 1/00 | (2006.01) |

(52) U.S. Cl.
CPC ............... *H02H 3/10* (2013.01); *H01C 7/02* (2013.01); *H02H 1/0007* (2013.01); *H02H 3/066* (2013.01)

(58) Field of Classification Search
CPC .................................... H02H 3/10; H01C 7/02
See application file for complete search history.

(56) References Cited

U.S. PATENT DOCUMENTS

| | | | | |
|---|---|---|---|---|
| 5,319,514 | A  * | 6/1994 | Walsh | H02H 3/253 |
| | | | | 340/662 |
| 6,181,541 | B1 * | 1/2001 | Souri | H02H 3/025 |
| | | | | 361/101 |
| 6,738,246 | B1 | 5/2004 | Strumpler | |
| 8,982,578 | B2 | 3/2015 | Bryan et al. | |
| 2008/0150613 | A1 | 6/2008 | Agata et al. | |
| 2008/0186789 | A1 | 8/2008 | Sumi et al. | |
| 2010/0302699 | A1 | 12/2010 | Minami | |
| 2011/0254476 | A1* | 10/2011 | Clothier | H02P 6/26 |
| | | | | 318/400.1 |
| 2013/0128406 | A1* | 5/2013 | Colby | H01H 85/048 |
| | | | | 361/104 |

* cited by examiner

*Primary Examiner* — Scott Bauer
(74) *Attorney, Agent, or Firm* — Young Basile Hanlon & MacFarlane, P.C.

(57) ABSTRACT

An electronic protection circuit includes a resettable fuse such as a positive temperature coefficient (PTC) thermistor or polymer PTC device. The resettable fuse enters a high-resistance tripped state in response to an overcurrent condition. One or more electrically controllable switches are placed in series with the resettable fuse. A monitoring and control circuit monitors voltage across the resettable fuse and to opens the switches when the voltage is outside of a predetermined range. The switches can remain open after the overcurrent event is resolved in order to allow the resettable fuse time to reset.

15 Claims, 7 Drawing Sheets

PROTECTION CIRCUIT INVOLVING POSITIVE TEMPERATURE COEFFICIENT DEVICE

FIELD OF THE INVENTION

The present invention pertains to the field of electronics and in particular to electrical protection circuits.

BACKGROUND

Electronic circuits often require protection from damaging overvoltage or overcurrent conditions. Fuses or similar devices such as breakers are typically employed for protective purposes. However, for compact or solid-state devices, small and low-cost resettable protection systems are often desired.

Positive temperature coefficient (PTC) devices are electronic components which include PTC thermistors as well as polymeric PTC devices under trade names such as polyswitch, polyfuse, multifuse, semifuse, and fuzetec. One known application for such PTC devices is as a resettable fuse in an electronic circuit. In such applications, when an overcurrent condition is present, the PTC device undergoes a rise in temperature, which results in a large increase in resistance of the device as the device enters a "tripped" state. This increased resistance counters the overcurrent condition, thereby protecting the circuit.

While it is straightforward to treat a PTC device as a fuse by placing it in series with a source of supply voltage, there are some limitations to PTC devices. PTC devices are often limited to a maximum operating voltage. For example, in many cases, polymeric PTC devices have a maximum operating voltage of 33 V. If the operating voltage is exceeded when the PTC device is in the tripped state, arcing and ignition can occur, potentially leading to catastrophic failure. Another limitation of PTC devices is the maximum fault current that can be passed through the PTC device. For example, a typical maximum fault current rating is around 40 A (at the rated voltage).

Therefore, there is a need for a protection circuit that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY

An object of the present invention is to provide a method and apparatus for electrical circuit protection. In accordance with aspects of the invention, there is a provided an electronic protection circuit and associated method. The electronic protection circuit includes a resettable fuse, such as a PTC device, coupled in series with one or more controllable switches. The switches are triggered by detection of at least a threshold voltage across the resettable fuse, thereby protecting the resettable fuse when it is in a tripped state.

According to an embodiment of the present invention, there is provided an electronic protection circuit including a resettable fuse coupled to a voltage terminal input, for example the resettable fuse located between a voltage terminal and a ground plane or a source of supply voltage, the resettable fuse configured to enter a high-resistance state in response to an overcurrent condition through the resettable fuse. The electronic protection circuit further includes one or more electrically controllable switches in series with the resettable fuse and a monitoring and control circuit configured to monitor a voltage across the resettable fuse and to open the switches when the voltage is outside of a predetermined range. The monitoring and control circuit can further be configured to cause the switches to reclose at a time which is after a determined or expected time at which the resettable fuse returns to a low-resistance state.

According to another embodiment of the present invention, there is provided a method for protecting a circuit, including monitoring a voltage across a resettable fuse, the resettable fuse element configured to transition from a low-resistance state to a high-resistance state in response to an overcurrent condition through the resettable fuse and in response to detection of the voltage exceeding a predetermined threshold, automatically opening one or more electrically controllable switches in series with the resettable fuse. The method may further include closing the one or more electrically controllable switches after a time when the resettable fuse element is determined or expected to have transitioned from the high-resistance state back to the low-resistance state.

BRIEF DESCRIPTION OF THE FIGURES

These and other features of the invention will become more apparent in the following detailed description in which reference is made to the appended drawings.

DETAILED DESCRIPTION

As used herein, the term "resettable fuse" is an electronic device, primarily but not necessarily limited to a PTC device, which operates in a relatively low-resistance state under nominal operating conditions but exhibits an increased circuit resistance in response to an overcurrent condition. The behavior of the electronic device, including the variation of resistance with respect to current, is sufficiently strong and fast that the electronic device functions as a suitable fuse in a range of applications. The electronic device is resettable in the sense that, immediately or some time after the overcurrent condition ceases (e.g. is expected to have ceased), the electronic device returns to its low-resistance state. Such electronic devices are typically passive electronic components. PTC devices use internal temperature as a basis to achieve the above-described behavior.

The present invention provides a method and apparatus including a resettable fuse, in which the resettable fuse is isolated and thereby protected in the case that it transitions to a high-resistance, tripped state. Having reference to FIG. 1, embodiments of the present invention provide an electronic protection circuit 100. The circuit includes a resettable fuse 110 and a controllable switch 120 in series with the resettable fuse 110. The resettable fuse 110 is configured to enter a high-resistance, tripped state in response to an overcurrent condition through the resettable fuse. The resettable fuse can be a PTC device. The switch can be a transistor such as a field-effect transistor (FET). Plural controllable switches can be provided in series, as illustrated by the presence of optional switch 122 cooperating with switch 120.

Figure 1:
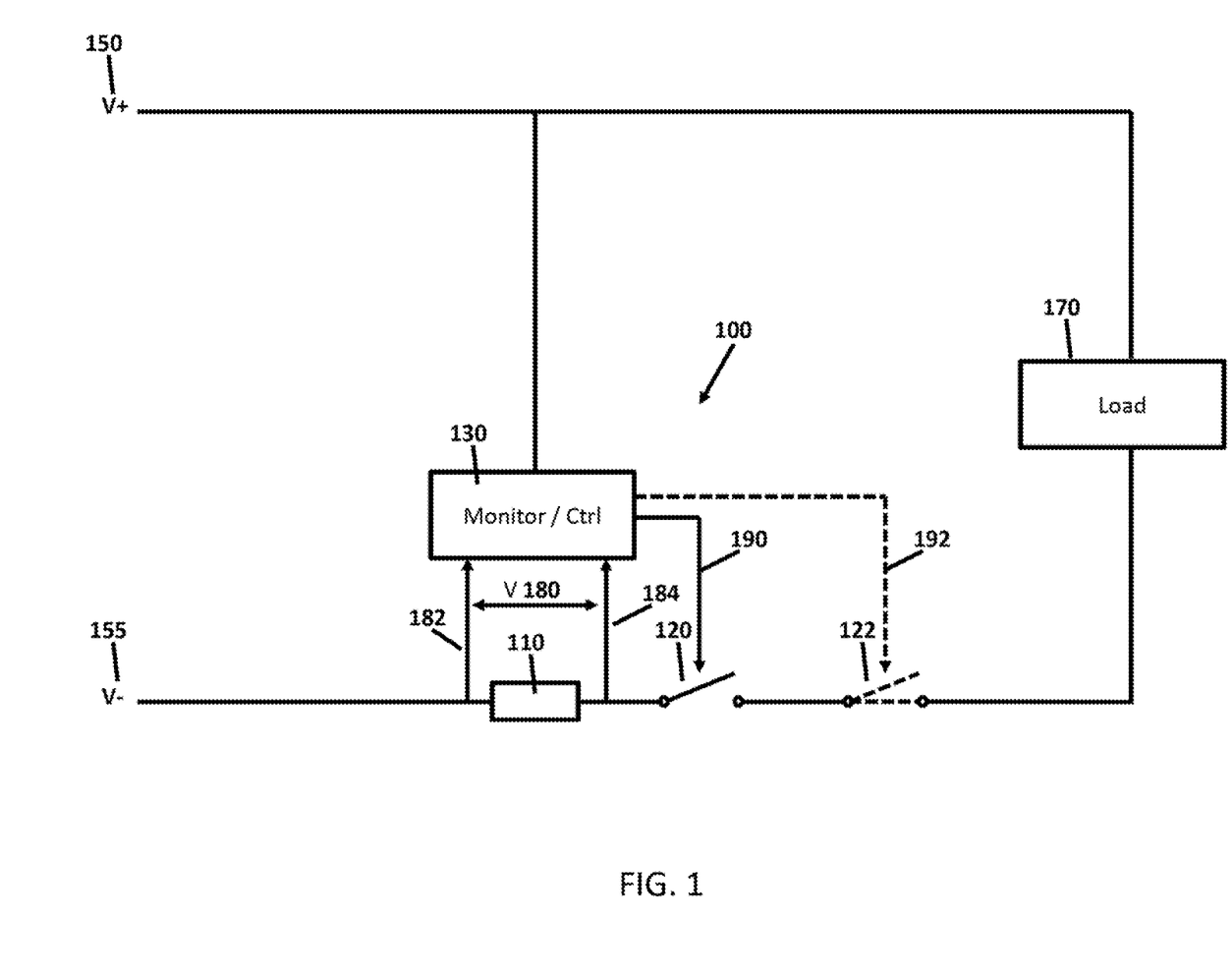
FIG. 1 illustrates an electronic protection circuit including a resettable fuse serially coupled with a controllable switch triggered by detection of at least a threshold voltage across the resettable fuse, according to an embodiment of the present invention.

As illustrated, the circuit 100 is connected to a positive voltage terminal 150 and the resettable fuse 110 and switch 120 are disposed in series between a negative voltage terminal 155 and a corresponding negative voltage terminal of a protected circuit (load) 170. The negative voltage terminal 155 may be connected to a ground plane. The positive and negative voltage terminals facilitate the supply of power and the protected circuit 170 is coupled to the positive voltage terminal 150 and is coupled to the negative voltage terminal 155 via the resettable fuse 110 and controllable switch 120. Thus, the protection circuit 100 operates to inhibit faults from affecting the protected circuit 170, or at least mitigate the effect of such faults. Further, the switch 120 operates to protect the resettable fuse 110 from faults, for example faults located on the load side of the circuit. The faults may involve high currents flowing to a ground plane via the negative voltage terminal 155, high currents flowing from the ground plane via the negative voltage terminal 155, or both at different times. Furthermore, in some instances the load could fail by drawing a high current due to a short circuit. In these instances, the circuit 100 can act to prevent the high current flow. As such the circuit 100 can protect the load from high and low voltages that may appear at the negative voltage terminal 155 because of an external fault, for example, a misconnection or transient spike of voltage. As such, when substantially any of these faults are too much for the resettable fuse 110 to handle, the circuit opens switch 120 in order to protect the resettable fuse 110. In some embodiments, the protected circuit 170 comprises circuitry of a wireless communication module.

Figure 5:
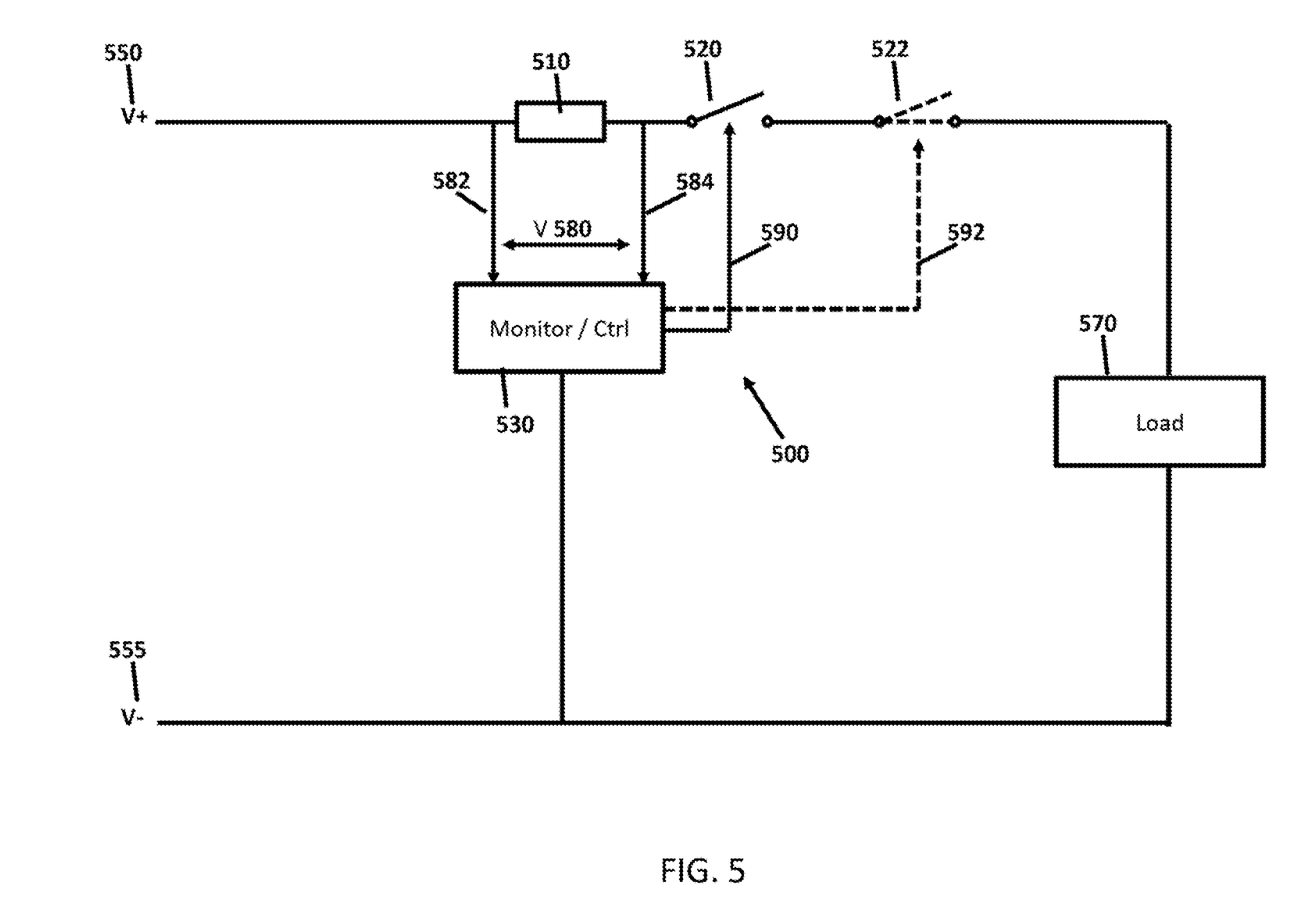
FIG. 5 an electronic protection circuit comprising a resettable fuse serially coupled with a controllable switch triggered by detection of at least a threshold voltage across the resettable fuse, according to another embodiment of the present invention.

It is considered that the protection circuit can alternatively be coupled between a source of positive supply voltage and a corresponding positive voltage terminal of the protected circuit, in order to protect the protected circuit 170 from faults such as high currents flowing into or out of the source of positive supply voltage. FIG. 5 illustrates such an alternative. In some embodiments, the negative voltage terminal 155 is connected to a source of (e.g. negative) supply voltage. In this case the positive voltage terminal 150 can be grounded or ungrounded.

Sources of supply voltage would be readily understood by a worker skilled in the art, and may feed multiple circuits including the protected circuit. Sources of supply voltage may be grounded at one terminal or ungrounded. A grounded source of supply voltage typically provides a substantially reliable (e.g. constant or variable with certain characteristics) voltage at one terminal, relative to ground, while allowing current to be drawn from said terminal and returned via a ground path. An ungrounded source of supply voltage typically provides a substantially reliable voltage difference between two terminals, while allowing current to be drawn via one terminal and returned via the other terminal.

The circuit 100 also includes a monitoring and control circuit 130 configured to monitor a voltage across the resettable fuse 110 and to open the switch 120 when the monitored voltage meets a predetermined fault-indicating condition, such as the monitored voltage falling outside of a predetermined range. The monitoring and control circuit 130 can include analog components such as resistors, capacitors, diodes and transistors. The voltage 180 across the resettable fuse 110 is monitored via a pair of electrical connections 182 and 184. The monitoring and control circuit 130 is coupled to the switch(es) 120, 122 via control connections 190, 192.

In operation, the resettable fuse 110 is initially in a normal, low-resistance state. An overcurrent event, comprising an adequately high current for an adequate amount of time, will cause the resettable fuse 110 to transition to its tripped, high-resistance state. For PTC devices this effect is well known and due to the device's reaction to heat resulting from the current applied over time. The required amount of current and time to cause transition into the tripped state can be configurable by design of the PTC device, as will be readily understood by a worker skilled in the art.

When the resettable fuse 110 is in its normal, low-resistance state, the voltage across the resettable fuse 110 will also be relatively low over a wide range of current values. The monitoring and control circuit 130 is configured to cause the switch(es) 120, 122 to remain in the closed position in response to detection of low voltage across the resettable fuse 110. As such, the negative voltage terminal 155 is connected to the ground plane 160 via a low-impedance path.

When the resettable fuse 110 enters the tripped state, the voltage across the resettable fuse 110 will increase, due to the increased impedance of the resettable fuse 110 in combination with potentially high current therethrough. The monitoring and control circuit 130 is configured to cause the switch(es) 120, 122 to open in response to detection of at least a predetermined amount of voltage across the resettable fuse 110. As such, the negative voltage terminal 155 is isolated from the load 170 by action of both the resettable fuse 110 and the switch(es) 120, 122 in series therewith.

The monitoring and control circuit 130 is further configured to cause the switch(es) 120, 122 to remain open for at least a predetermined amount of time following opening thereof. In some embodiments, a timing circuit can be provided and configured to sustain the switch opening signal generated by the monitoring and control circuit 130 for an amount of time. The timing circuit can be implemented for example using resistors and capacitors coupled to the inputs of transistors in the monitoring circuit. The resistance and capacitance values can be selected to sustain the switch opening signal for a desired amount of time.

Additionally or alternatively, in some embodiments, an event-driven input, such as a manual or automatic reset signal or other input, can be used to cause the switch(es) 120, 122 to close following opening thereof. The monitoring and control circuit 130 may monitor for an indication that the resettable fuse 110 has transitioned back to its normal state, and close the switches in response to such an indication. Such monitoring may comprise monitoring the voltage across the resettable fuse 110, for example using a test current.

In general, the monitoring and control circuit can be configured to close the switch(es) after a determined or expected time at which the resettable fuse transitions from the high-resistance state to a low-resistance state. This may be done either in an open-loop or a closed-loop manner. For the open-loop case, the switches can be held open using timing circuitry for a set period of time which is greater than or equal to the expected amount of time that the resettable fuse takes to return to its low-resistance state. The timing circuitry can but does not necessarily measure time directly. For example, the timing circuit may indirectly measure time based on characteristics that vary over time at a limited rate, such as charging or discharging of a capacitor or inductor. For the closed-loop case, the switches can be held open until a monitoring circuit detects that the resettable fuse has returned to its low-resistance state.

The monitoring and control circuit 130 can be configured to open the switch(es) 120, 122 in response to both excess positive or negative voltage (with respect to a selected reference direction across the resettable fuse 110). For this purpose, and in some embodiments, the monitoring may include a first portion configured to open the switches when the voltage is above a first predetermined threshold (e.g. a positive threshold) and a second portion configured to open the switches when the voltage is below a second predetermined threshold (e.g. a negative threshold) lower than the first predetermined threshold. The monitoring circuit can further be configured to close the switch(es) 120, 122 in response to a reset condition such as a predetermined time elapsing.

Accordingly, once an overcurrent event causes the resettable fuse 110 to (e.g. exponentially) increase its impedance and enter the tripped state, the active monitoring and control circuit will detect a differential voltage across the resettable fuse 110 and open the switch(es) 120, 122 to protect the resettable fuse 110.

When the resettable fuse 110 is operating in its normal state, a high voltage transient will not cause a violation of its maximum operating voltage because the resettable fuse 110 has a low impedance in its normal state. It is primarily when it is in a high-impedance state (i.e. tripped) that a high voltage transient can damage the resettable fuse 110. Thus, opening the switch(es) 120, 122 assists in inhibiting damage from occurring to the resettable fuse 110. This allows lower voltage rated resettable fuses 110 to be used in a product, even if the product is rated at a higher voltage specification. A lower voltage rating also allows selection of resettable fuses 110 having higher current ratings and smaller physical packaging.

Opening the switch(es) 120, 122 will, under normal conditions, cut off all or substantially all current to the resettable fuse 110 and allow it to cool down. This inhibits the resettable fuse 110 from staying in a tripped state, and allows the system to power-up without excess power consumption. It is known that PTC devices such as polymer PTC devices can remain in the tripped state due to continued low current which sustains an adequate amount of heat generation to keep the PTC device in the high-resistance state. This can result in an undesirable failure to reset which is mitigated by embodiments of the present invention.

Other, more complex conditions can be used to trigger the monitoring and control circuit. For example, the monitoring and control circuit can cause the switches to open after a delay which decreases with the monitored voltage, or in response to detection of a certain characteristic of measured voltage, current or power.

Embodiments of the present invention provide robust circuit protection on the ground/return path, for example as connected to the load's negative voltage terminal. This ground path can be particularly noisy because of a diversity of electrical devices sharing a common ground. It has been recognized by the inventor that use of a resettable fuse on its own can be problematic because such devices are not able to sustain high-voltage transients in their tripped state without failure. Furthermore, such devices may be inhibited from returning to their normal state if a nonzero but acceptable amount of current remains flowing through the resettable fuse. The present invention can operate to interrupt such current, thus allowing the resettable fuse to return to its normal state, for example by cooling.

In various embodiments, the present invention effectively prevents the PTC device (or other resettable fuse) from remaining in a "tripped" state under conditions that may be damaging to the PTC device (or other resettable fuse). The PTC device or other resettable fuse can be protected by being isolated from the circuit when the fault exceeds the PTC device's (or other resettable fuse's) capabilities. In this instance, the circuit also takes over the protection of the load. As such, there is no opportunity for an overcurrent event to cause damage to the PTC. The consequences of the two limiting factors of PTC devices (maximum voltage and maximum current ratings) can thus be partially or fully avoided.

Embodiments of the present invention provide for one or more of: ground fault protection, reverse polarity protection, and supply voltage overcurrent protection.

Embodiments of the present invention provide additional circuit isolation in the event that the resettable fuse enters the tripped state. This facilitates tolerance of the protection circuit to higher voltage spikes that would not be tolerated by the resettable fuse alone.

Figure 2:
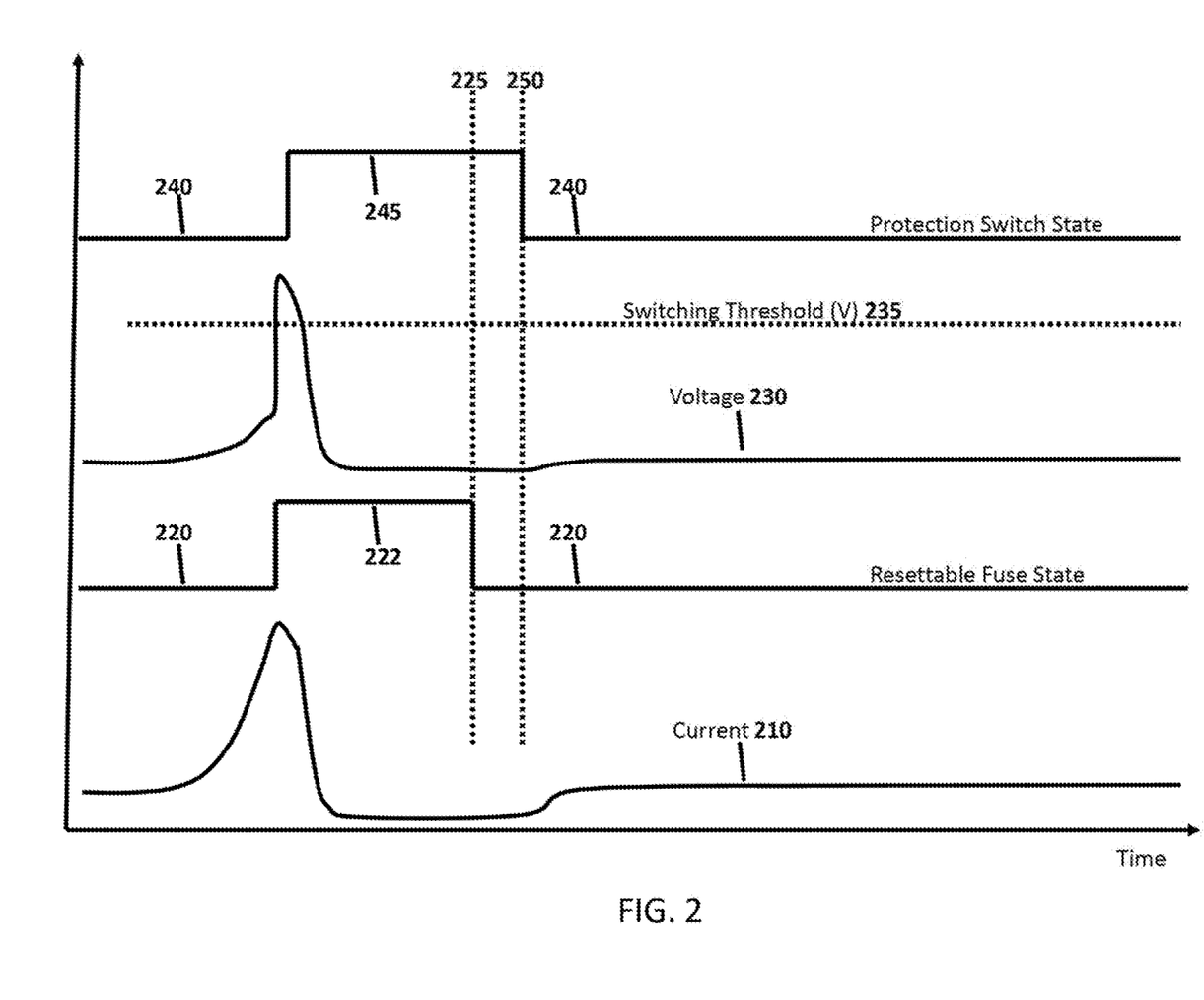
FIG. 2 illustrates example operation of the protection circuit of FIG. 1, according to an embodiment of the present invention.

FIG. 2 graphically illustrates example operation of the protection circuit 100, according to an embodiment of the present invention. For clarity, the resettable fuse is assumed to be ideal such that it instantly transitions between normal and tripped states. However, in practice, the transitions will be more gradual and possibly history-dependent. A current 210 passes through the resettable fuse, which is initially in a normal, low-resistance state 220. Due to a fault event, the current rapidly increases, causing the resettable fuse to transition to the tripped, high-resistance state 222. Upon this transition, the current begins to rapidly reduce, due to the high resistance of the resettable fuse.

The voltage 230 across the resettable fuse is proportional to the current according to an approximately ohmic relationship. However, the proportionality constant varies according to the state of the resettable fuse. Therefore (under the present idealization), when the resettable fuse is in the normal state, the voltage varies according to $V=IR_1$, and when the resettable fuse is in the tripped state, the voltage varies according to $V=IR_2$, where $R_2>R_1$, I is the current 210 and V is the voltage 230. This effect is illustrated in FIG. 2 by the rapid change in voltage 230 coincident with state transitions of the resettable fuse.

The monitoring and control circuit monitors the voltage 230 and causes the switch(es), which are initially closed 240, to open 245 when the voltage exceeds a predetermined threshold 235. At this point, the voltage 230 and current 210 will rapidly decay. The decay time in FIG. 2 is exaggerated for clarity. The monitoring and control circuit holds the switches open and operates them to close 240 again at a time 250 which is preferably after a time 225 at which the resettable fuse transitions back to the normal state. Resetting of the resettable fuse may be automatic, for example in response to thermal cooling under low current 210.

Figure 3:
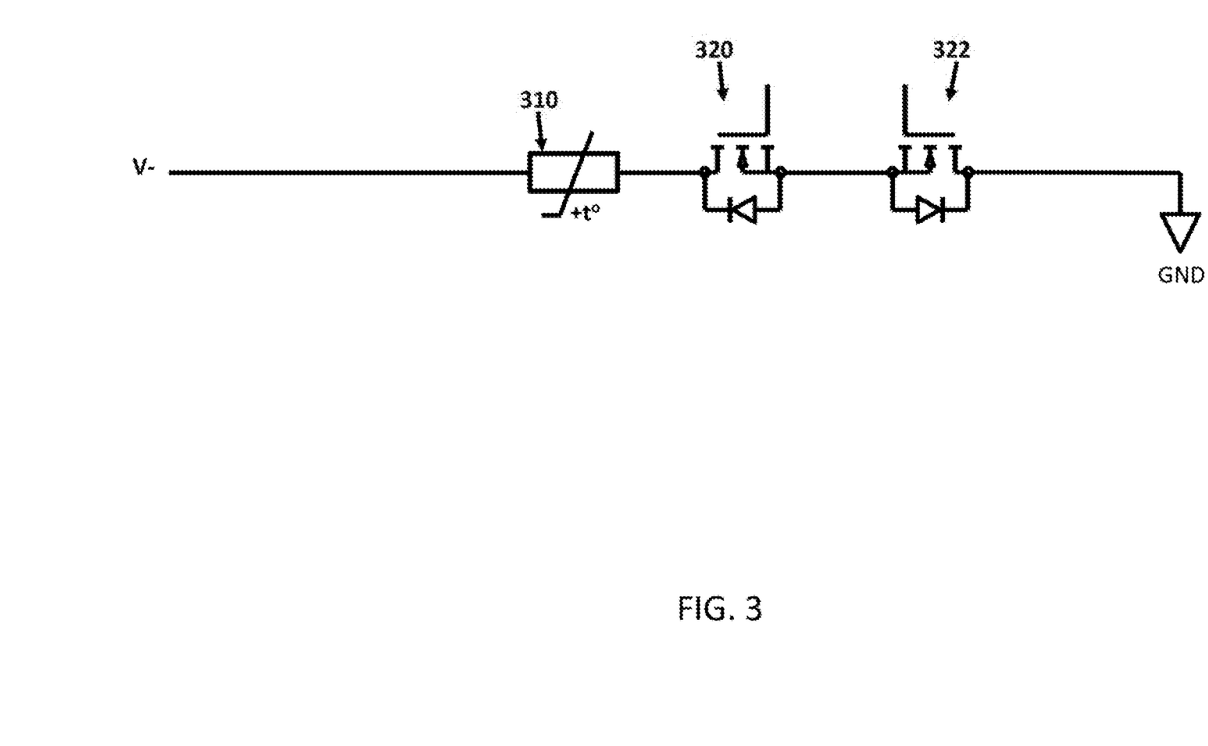
FIG. 3 illustrates a pair of serially-connected switches in series with a PTC device, according to an embodiment of the present invention.

FIG. 3 illustrates a pair of serially-connected switches 320, 322 in series with a PTC device 310 in accordance with an embodiment of the present invention. The switches 320, 322 are provided as back-to-back FETs (e.g. N-Channel MOSFETs) with freewheeling diode protection. The two N-Channel MOSFETs can be connected together via their source terminals.

Figure 4A:
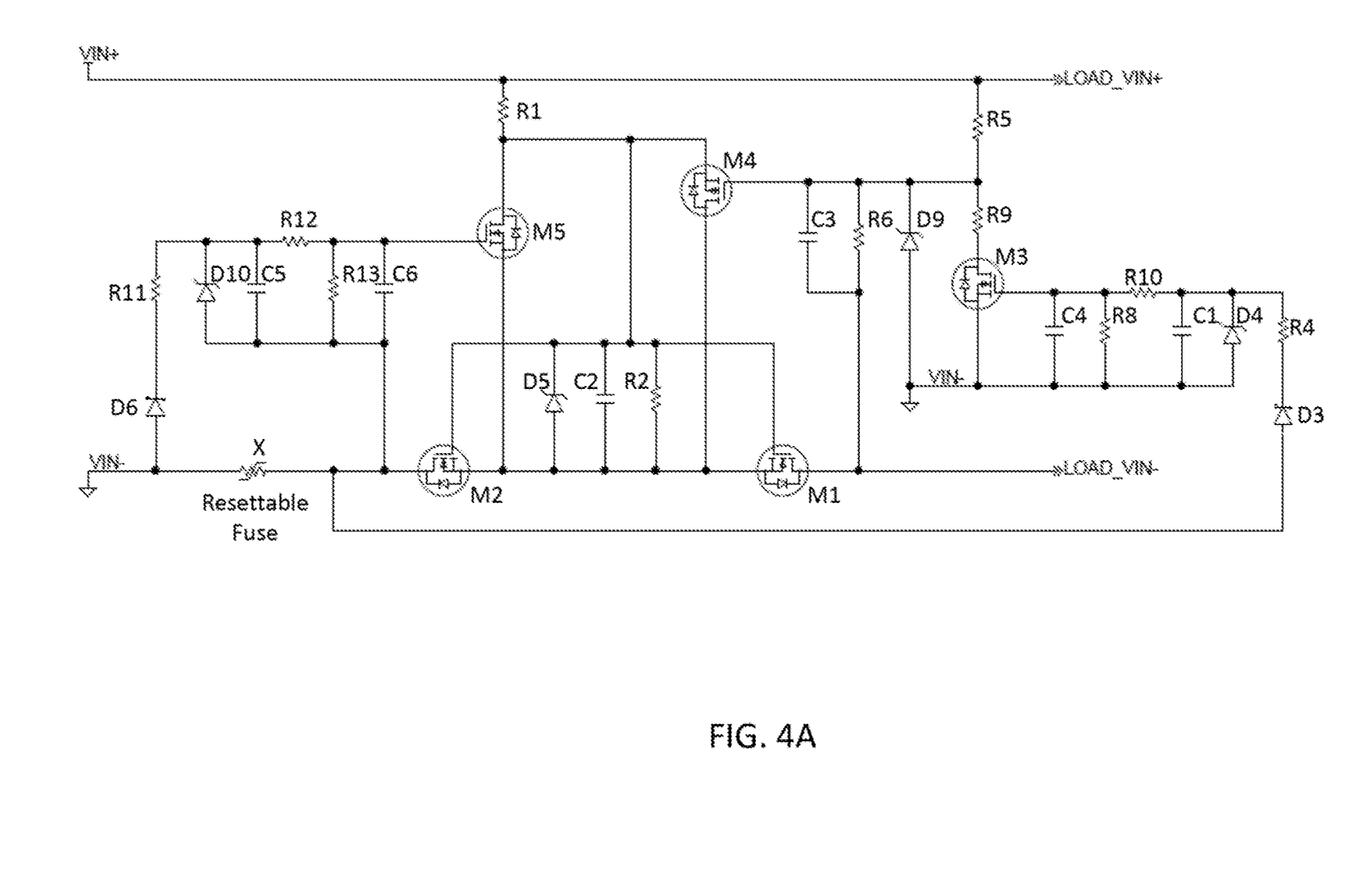
FIGS. 4A and 4B schematically illustrate a detailed electronic protection circuit, according to an embodiment of the present invention.
Figure 4B:
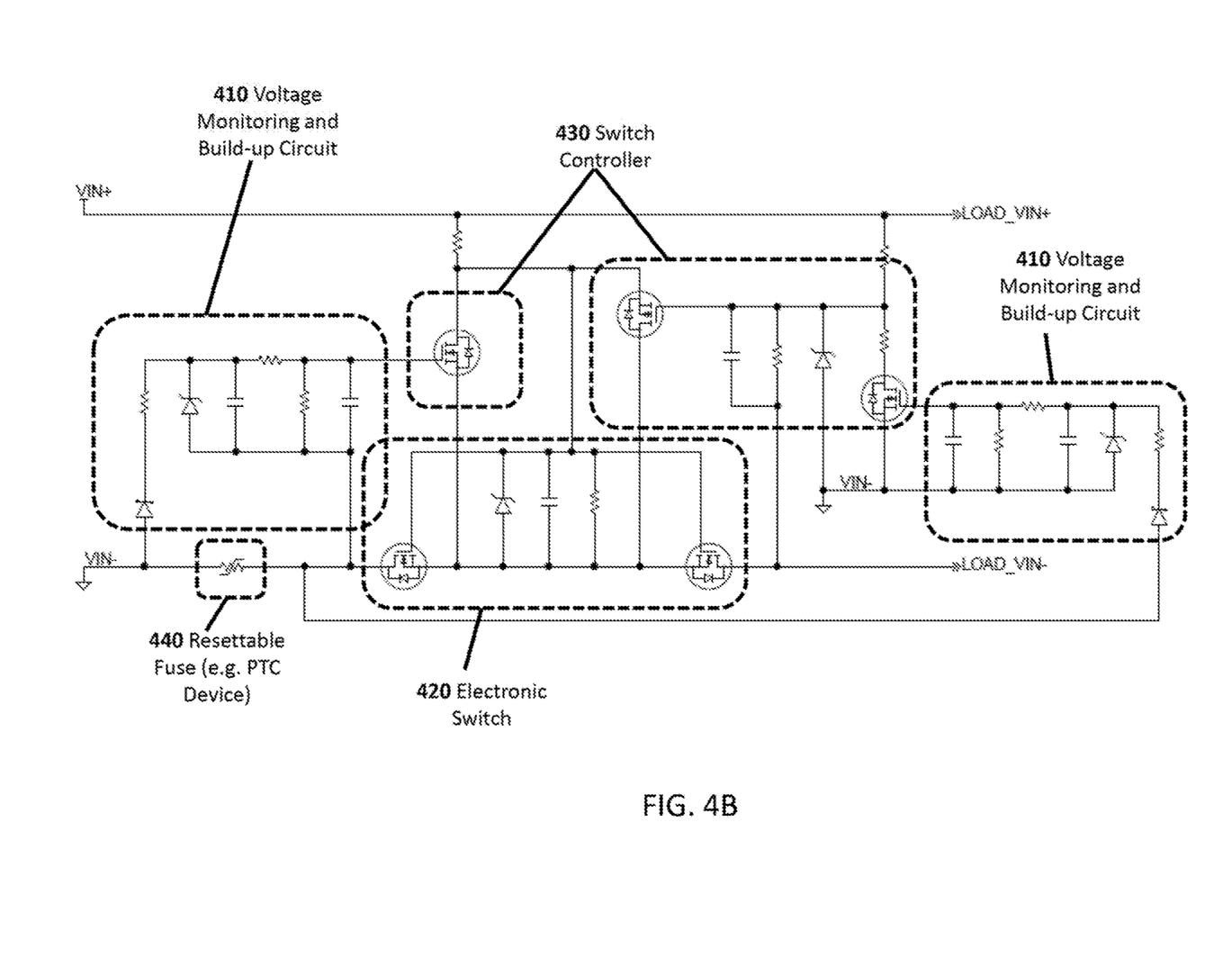

FIGS. 4A and 4B schematically illustrate a detailed electronic protection circuit in accordance with an embodiment of the present invention. VIN+ and VIN− represent the positive and negative voltage terminals. The negative voltage terminal may be grounded in some embodiments. The resettable fuse is represented by the component labeled X. LOAD_VIN+ and LOAD_VIN− represent terminals for connection to the positive and negative voltage inputs of the protected circuit (load), respectively.

The circuit comprises diodes D3, D4, D5, D6, D9 and D10. Of these, diodes D3 and D6 are Shottky diodes and diodes D4, D9 and D10 are Zener diodes. In some embodiments, diodes D3 and D6 may be MBRS340 Schottky rectifiers from ON Semiconductors®, or equivalents. Alternatively, diodes D3 and D6 may be standard P-N junction diodes. In some embodiments, diodes D4 and D10 may be BZX84C15L Zener diodes from ON Semiconductors®, or equivalents. In some embodiments, diodes D5 and D9 may be BZX84C10L Zener diodes from ON Semiconductors®, or equivalents.

The purpose of D5 is to clamp the voltage to inhibit violation of the maximum rated drain-to-source voltage Vds(max) of FET M5 and the maximum rated gate-to-source voltage Vgs(max) of M1, M2, and M4. FET M4 is protected by a combination of D5 and D9. This can allow for the use of inexpensive, low Vds(max) rated MOSFETs.

The circuit comprises FETs M1, M2, M3, M4 and M5. Of these, FETs M1, M2, M3 and M5 may be N-Channel MOSFETs, and FET M4 may be a P-Channel MOSFET. Other types of transistors may also be used. In some embodiments, FETs M1 and M2 may be Si7336ADP N-Channel MOSFETs from ON Semiconductors® or Vishay Siliconix™, or equivalents. In some embodiments, FETs M3 and M5 may be Si9936DY N-Channel MOSFETs from ON Semiconductors® or Vishay Siliconix™, or equivalents. In some embodiments, FET M4 may be a IRF7220 power MOSFET from International Rectifier™, or equivalent. Some of all of the FETs may include freewheeling diode protection, for example using body diodes that are intrinsic to the FETs.

In some embodiments, the following resistor values may be used: R1=90 kΩ, R2=400 kΩ, R4=1 kΩ, R5=40 kΩ, R6=400 kΩ, R8=400 kΩ, R9=100Ω, R10=10 kΩ, R11=1 kΩ, R12=10 kΩ, and R13=400 kΩ.

In some embodiments, the following capacitance values may be used: C1=1 µF, C2=100 nF, C3=100 nF, C4=220 nF, C5=1 µF, C6=220 nF.

R2 is a weak pull-up resistor used to tie the source terminals of M1 and M2 to their gate terminals. This causes the FETs to be switched off by default even when VIN+ or VIN− is initially floating.

In addition, an RC timer provided by cooperation of R1 and C2 is provided, which allows fine tuning of the time duration it takes M1 and M2 to close from an open state. This RC timer can be operated in cooperation with the pull-up resistor R2.

Although particular components and values are listed above, it will be readily understood by a worker skilled in the art that these components and their values can be varied while retaining the operability of the present invention.

During normal operation, FETs M1 and M2, which are operated as switches in series with the resettable fuse, will be closed and the resettable fuse X1, X2 (e.g. polyfuse) will be in a low impedance state. If a large current spike is generated from VIN− to SYS_GND, the resettable fuse operates to enter a high-impedance tripped state. FET M5, and associated components, monitor the voltage potential across the resettable fuse and operate to open switches provided as FETs M1 and M2. If the current spike is generated from the SYS_GND to VIN−, FET M3 monitors the voltage potential and opens up M1 and M2 via FET M4 when the resettable fuse trips. The primary purpose of FET M4 is to invert the signal provided by FET M3.

Since the voltage potential across the resettable fuse is monitored, the FETs M1 and M2 can be opened in response to both positive and negative voltage transients. This configuration provides circuit protection due to both inflowing and outflowing overcurrents. If the voltage potential developed across the resettable fuse is not high enough to cause FET M5 or FET M3 to activate, the resettable fuse is still considered to be safely operating under its maximum operating voltage.

RC timers are provided by cooperation of R11 and C5, and cooperation of R4 and C1. These RC timers cause the FETs M1 and M2 to remain open after the voltage spike dissipates, in order to allow the resettable fuse reset (e.g. due to cooling) back into a low impedance state after it trips. The values of R11, C5, R4 and C1 can be configured to adjust the duration of time during which FETs M1 and M2 are caused to stay open. The RC timer provided using R11 and C5 cooperates with R12, R13, and C6 to control the time duration for which M1 and M2 are kept opened. The RC timer provided using R4 and C1 cooperates with R10, R8, and C4 to control the time duration M1 and M2 are kept opened.

FIG. 4B illustrates the same circuit as FIG. 4A, but with several functional blocks identified. In particular, the resettable fuse 440 is shown in series with the electronic switch 420, which comprises two switches in series. A voltage monitoring and build-up circuit 410, which is shown in two parts, monitors the voltage across the resettable fuse and include the RC timers for holding the electronic switch 420 in the open position for a set time following opening thereof. The circuit 410 can react quickly to cause opening of the switch 420 and react slowly to cause closing of the switch 420. A switch controller 430 comprising FET switches M3, M4 and M5 operates the electronic switch 420 based on output of the voltage monitoring and build-up circuit.

Although the circuit of FIGS. 4A and 4B is implemented using capacitors, resistors, diodes, and transistors, it should be understood that there are a variety of ways of constructing such a circuit. Switches can comprise transistors, relays, or other types of switching components. Digital, analog, or a combination of digital and analog components can be used. However, it is typically desirable that the circuit be relatively low-cost and reliable. Operational amplifiers, for example as part of voltage comparator circuits, can be included and used for voltage monitoring operations.

Reverse polarity protection of the circuit of FIGS. 4A and 4B is provided as follows. FETs M1 and M2 are opened by default and will not close unless the voltage at VIN+ is higher than VIN−. This is due to the gate-to-source threshold voltage (Vgs) inherent to FETs M1 and M2. As such, if the circuit is connected with reverse polarity, closure of the switches M1 and M2 are inhibited.

It is also noted that portions of the voltage detection circuit comprising FETs M3 and M4 can be replaced by an operational amplifier. The PTC device may be placed on the other side of the switch, i.e. between the switch and the terminal marked LOAD_VIN−. In this instance the control circuitry can be suitably modified for this configuration. The circuit can be mirrored based on the location of the PTC device.

FIG. 5 illustrates an electronic protection circuit 500 including a resettable fuse 510 and controllable switch(es) 520, 522 coupled in series between a positive voltage terminal 550 of a power supply (i.e. a source of supply voltage) and a corresponding positive voltage terminal of a protected circuit 570. The protection circuit is similar to the circuit 100 illustrated in FIG. 1. A monitoring and control circuit 530 monitors voltage 580 across the resettable fuse 510 via connections 582, 584 and operates switch(es) 520, 522 via control line(s) 590, 592 when the voltage 580 exceeds a predetermined threshold. The switch(es) 520, 522 can be reclosed after a delay. The protected circuit 570 and the monitoring and control circuit 530 can be coupled to the same negative (possibly grounded or ungrounded) voltage terminal 555. The protection circuit 500 can operate alone or along with the protection circuit 100 of FIG. 1. The two protection circuits 100 and 500 can be integrated together, for example sharing components and used for protecting against faults occurring via both the positive and negative voltage terminals.

Figure 6:
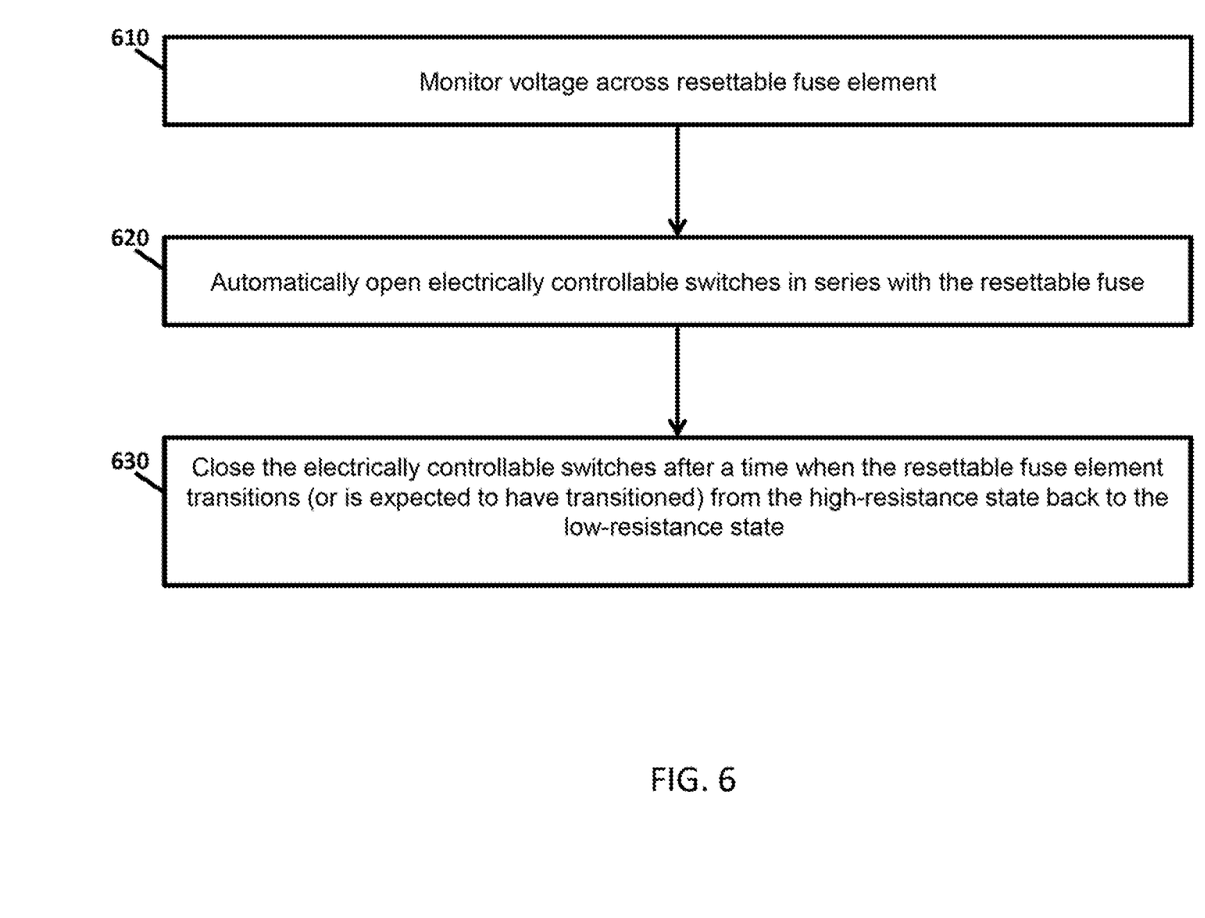
FIG. 6 illustrates a method for protecting a circuit by cooperation of a resettable fuse and one or more switches, according to embodiment of the present invention.

FIG. 6 illustrates a method for protecting a circuit by cooperation of a resettable fuse and one or more switches, in accordance with an embodiment of the present invention. The method includes monitoring 610 a voltage across a resettable fuse element. The resettable fuse element is configured to transition from a low-resistance state to a high-resistance state in response to an overcurrent condition through the resettable fuse. The method further includes, in response to detection of the voltage exceeding a predetermined threshold, automatically opening 620 one or more electrically controllable switches in series with the resettable fuse. The method may further include closing 630 the one or more electrically controllable switches after a time when the resettable fuse element transitions (e.g. is expected to have transitioned) from the high-resistance state back to the low-resistance state.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. An electronic protection circuit comprising:
   a resettable fuse coupled to a voltage terminal input, the resettable fuse configured to enter a high-resistance state in response to an overcurrent condition through the resettable fuse;
   one or more electrically controllable switches in series with the resettable fuse; and
   a monitoring and control circuit configured to monitor a voltage across the resettable fuse and to open the switches in response to detection of the voltage across the resettable fuse being outside of a predetermined range, and
   wherein detection includes detection of both positive and negative voltage transients outside of the predetermined range.

2. The circuit of claim 1, wherein the resettable fuse is a positive temperature coefficient (PTC) thermistor or a polymeric PTC device.

3. The circuit of claim 1, wherein the electronic protection circuit is located between a ground plane and a negative voltage terminal of a protected circuit.

4. The circuit of claim 1, wherein the electronic protection circuit is located between a positive or negative source of supply voltage and a positive or negative voltage terminal of a protected circuit.

5. The circuit of claim 1, wherein the one or more electrically controllable switches include a pair of switches placed in series.

6. The circuit of claim 5, wherein the monitoring and control circuit is electrically coupled to the pair of switches and to an electrical conductor directly coupling the pair of switches.

7. The circuit of claim 1, wherein the switches are transistors.

8. The circuit of claim 1, wherein the monitoring and control circuit is further configured to close the one or more switches after a predetermined time thereby transitioning the resettable fuse from the high-resistance state to a low-resistance state.

9. The circuit of claim 1, wherein the monitoring and control circuit is further configured to close the one or more switches after cessation of the overcurrent condition, an overvoltage condition, or both.

10. The circuit of claim 1, wherein the monitoring and control circuit comprises a first portion configured to open the one or more switches when the voltage is above a first predetermined threshold and a second portion configured to open the switches when the voltage is below a second predetermined threshold lower than the first predetermined threshold.

11. The circuit of claim 10, wherein the first portion comprises a first timing circuit, the first portion configured to rapidly operate the switches to open when the voltage is above the first predetermined threshold and to hold the switches open until timeout of the first timing circuit.

12. The circuit of claim 10, wherein the second portion comprises a second timing circuit, the second portion configured to rapidly operate the switches to open when the voltage is below the second predetermined threshold and to hold the switches open until timeout of the second timing circuit.

13. A method for protecting a circuit, comprising:
   monitoring a voltage across a resettable fuse, the resettable fuse configured to transition from a low-resistance state to a high-resistance state in response to an overcurrent condition through the resettable fuse;
   in response to detection of the voltage across the resettable fuse being outside of a predetermined threshold, automatically opening one or more electrically controllable switches in series with the resettable fuse, and
   wherein detection includes detection of both positive and negative voltage transients outside of the predetermined range.

14. The method of claim 13, further comprising closing the one or more electrically controllable switches after a predetermined time thereby transitioning the resettable fuse from the high-resistance state back to the low-resistance state.

15. The circuit of claim 13, further comprising opening a first portion of the one or more switches when the voltage is above a first predetermined threshold and opening a second portion of the switches when the voltage is below a second predetermined threshold that is lower than the first predetermined threshold.

\* \* \* \* \*